US011630886B2

(12) United States Patent
Hazan

(10) Patent No.: US 11,630,886 B2
(45) Date of Patent: Apr. 18, 2023

(54) COMPUTER SECURITY FORENSICS BASED ON TEMPORAL TYPING CHANGES OF AUTHENTICATION CREDENTIALS

(71) Applicant: International Business Machines Corporation, Armonk, NY (US)

(72) Inventor: Itay Hazan, Beer Sheva (IL)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 17/023,621

(22) Filed: Sep. 17, 2020

(65) Prior Publication Data

US 2022/0083633 A1    Mar. 17, 2022

(51) Int. Cl.
*G06F 21/31* (2013.01)
(52) U.S. Cl.
CPC .................. *G06F 21/316* (2013.01)
(58) Field of Classification Search
CPC .................................................. G06F 21/316
USPC .......................................................... 726/7
See application file for complete search history.

(56) References Cited

U.S. PATENT DOCUMENTS

| 6,151,593 A * | 11/2000 | Cho | G06F 21/31 706/16 |
| 8,134,449 B2 | 3/2012 | Wu, Jr. | |
| 8,230,232 B2 * | 7/2012 | Ahmed | G06F 21/316 713/186 |
| 8,332,932 B2 | 12/2012 | Kellas-Dicks | |
| 8,489,635 B1 | 7/2013 | Phoha | |
| 8,856,955 B2 | 10/2014 | Hinds | |

(Continued)

FOREIGN PATENT DOCUMENTS

| CN | 101478401 B | 4/2011 |
| CN | 104778387 B | 12/2017 |

(Continued)

OTHER PUBLICATIONS

Awad et al., "Digital Fingerprinting Based on Keystroke Dynamics," Proceedings of the Second International Symposium on Human Aspects of Information Security & Assurance (HAISA 2008), Jan. 2008, 13 pps.

(Continued)

*Primary Examiner* — Jacob Lipman
(74) *Attorney, Agent, or Firm* — Stephen R. Yoder

(57) ABSTRACT

Aspects of the present invention disclose a method, computer program product, and system for employing keystroke dynamics authentication. The method includes one or more processors recording, for a plurality of users, a respective keystroke session of multiple typing samples (typed consecutively) of a credential associated with a respective user of the plurality. The method further includes extracting a set of features that characterize typing changes between the multiple typing samples. The method further includes detecting repeated typing of a certain one of the credentials that is associated with a certain user of the plurality. The method further includes extracting, from the repeated typing of the certain credential, a set of features that characterize typing changes between repetitions. The method further includes comparing the feature set extracted from the repeated typing against feature sets extracted from a set of the keystroke sessions, estimating which user is the first user.

20 Claims, 2 Drawing Sheets

(56) References Cited

U.S. PATENT DOCUMENTS

| | | |
|---|---|---|
| 9,268,927 B1 | 2/2016 | Phoha |
| 10,262,324 B2 | 4/2019 | Turgeman |
| 10,474,815 B2 | 11/2019 | Turgeman |
| 2004/0059950 A1 | 3/2004 | Bender |
| 2006/0242424 A1 | 10/2006 | Kitchens |
| 2006/0271790 A1 | 11/2006 | Chen |
| 2008/0098456 A1* | 4/2008 | Alward ................. G06F 21/316 726/1 |
| 2009/0049555 A1 | 2/2009 | Cho |
| 2009/0150992 A1 | 6/2009 | Kellas-Dicks |
| 2010/0036783 A1* | 2/2010 | Rodriguez ............ H04L 9/3226 706/15 |
| 2013/0343616 A1 | 12/2013 | Forero |
| 2014/0351914 A1 | 11/2014 | Suresh |
| 2017/0199995 A1* | 7/2017 | Noh ...................... G06F 21/316 |

FOREIGN PATENT DOCUMENTS

| | | | |
|---|---|---|---|
| CN | 108306884 B | 6/2020 | |
| EP | 2477136 A1 | 7/2012 | |
| EP | 2919422 A1 | 9/2015 | |
| GB | 2470579 A | 7/2009 | |
| JP | 3734510 B2 * | 1/2006 | ........... G06F 21/316 |
| WO | 2013006071 A1 | 1/2013 | |
| WO | 2022058847 A1 | 3/2022 | |

OTHER PUBLICATIONS

Haider et al., "A Multi-Technique Approach for User Identification through Keystroke Dynamics," Proc. IEEE Int. Conf. Systems, Man, and Cybernetics, vol. 2, 2000, pp. 1336-1341.

"Patent Cooperation Treaty PCT International Search Report", Applicant's file reference P201912104, International application No. PCT/IB2021/058198, International filing date Sep. 9, 2021, dated Nov. 25, 2021, 7 pages.

* cited by examiner

COMPUTER SECURITY FORENSICS BASED ON TEMPORAL TYPING CHANGES OF AUTHENTICATION CREDENTIALS

BACKGROUND OF THE INVENTION

The present invention relates generally to the field of computer security, and more particularly to keystroke dynamics.

Keystroke dynamics is a highly researched topic in the behavioral biometrics domain. Keystroke dynamics identifies and measures the manner and rhythm in which a person types on a keyboard (a physical or a virtual keyboard). For example, a keystroke dynamics system can tell different people apart by how quickly they tend to type, whether they type all characters at the same pace or tend to pause before typing specific characters, how long they usually hold each key, etc.

Authentication by keystroke dynamics typically involves a machine learning algorithm that uses several logged keystroke sessions to train a model that is characteristic of the pertinent user. Then, a new keystroke session of the user (or someone professing to be the user) can be compared, by the machine learning algorithm, to the model. When the contents of this new keystroke session sufficiently fit the model, then the identity of the user is authenticated.

SUMMARY

Aspects of the present invention disclose a method, computer program product, and system for employing keystroke dynamics authentication. The method includes one or more processors recording, for a plurality of users of a computerized system, a respective keystroke session that comprises multiple typing samples of a credential associated with a respective user of the plurality of users. The multiple typing samples are typed consecutively by the respective user. The method further includes one or more processors extracting, from each of the respective keystroke sessions, a set of features that characterize typing changes between the multiple typing samples. The method further includes one or more processors detecting an attempt by a first user to circumvent the keystroke dynamics authentication and log into the computerized system by detecting repeated typing of a certain one of the credentials that is associated with a certain user of the plurality of users. The method further includes one or more processors extracting from the repeated typing of the certain credential by the first user, a set of features that characterize typing changes between the repetitions. The method further includes one or more processors comparing the feature set extracted from the repeated typing of the credential by the first user against the feature sets extracted from a set of the keystroke sessions, to estimate which user of the plurality of users is the first user.

BRIEF DESCRIPTION OF THE DRAWINGS

Exemplary embodiments are illustrated in referenced Figures. Dimensions of components and features shown in the Figures are generally chosen for convenience and clarity of presentation and are not necessarily shown to scale. The Figures are listed below.

DETAILED DESCRIPTION

Figure 1:
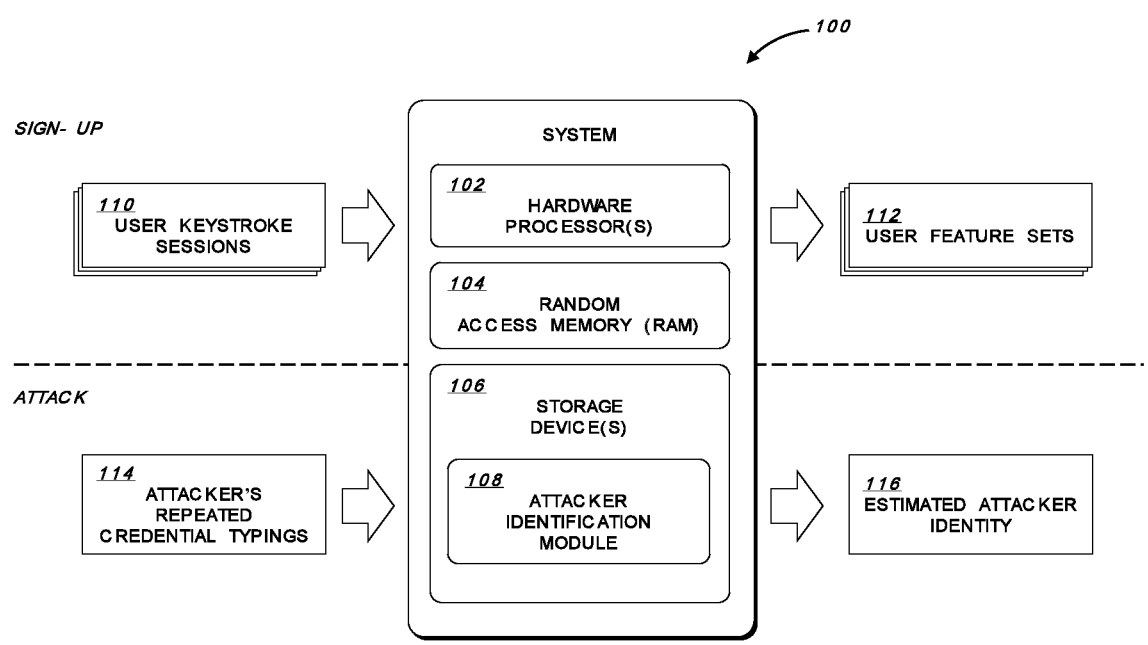
FIG. 1 is a block diagram of an exemplary system for estimating the identity of a user who attempts to log into the system by circumventing keystroke dynamics authentication functionality, in accordance with embodiments of the present invention.

Embodiments of the present invention recognize that keystroke dynamics of individuals are quite unique, enabling a security system to reliably authenticate the identity of a person based on his or her measured keystroke dynamics. Therefore, some security systems use keystroke dynamics as either an add-on to traditional authentication techniques (such as passwords, tokens, two-factor authentication, etc.), or as a complete replacement of such techniques.

The foregoing examples of the related art and limitations related therewith are intended to be illustrative and not exclusive. Other limitations of the related art will become apparent to those of skill in the art upon a reading of the specification and a study of the Figures.

Disclosed herein is a technique, embodied as a method, system, and computer program product, for computer security forensics based on temporal typing changes of authentication credentials. Embodiments of the present invention operate to estimate the identity of a computer system user who attempts to log into the computerized system by circumventing the keystroke dynamics authentication functionality.

Various embodiments of the present invention provide advantages when operating in conjunction with a keystroke dynamics authentication functionality of the kind that requires users to type a credential (e.g., a username, a password, etc.), and then analyzes keystroke dynamics of the typing in order to decide whether to allow the user to log in or not. Assuming that the credential matches the user's predefined credential, and the keystroke dynamics match the user's pre-constructed keystroke dynamics model, then the user is allowed to log in.

Attackers may attempt to circumvent such keystroke dynamics authentication functionality by first gaining access to a user's credential (via means such as phishing, social engineering, guesswork, etc.), and then trying to log into the computerized system by typing the credential. When the log in attempt fails, the attacker types the credential again and again, in the hopes that one of the next repetitions will be accepted by the computerized system as valid. As the attacker types the same credential again and again in a row, the typing style will tend to gradually evolve, unconsciously, which is mainly due to the cognitive learning process ('learning curve') involved in the repetitive typing of the same string of characters.

Although the computerized system can typically deduce from such series of failed log in attempts that an attack is under way, embodiments of the present invention recognize that the system still cannot readily identify the attacker, except for recording various general identifiers, such as the attacker's Internet Protocol (IP) address (which might be forged or be otherwise non-useful for conclusive identification).

Further, embodiments of the present invention can advantageously enable the computerized system to attribute the attack to a specific user of the computerized system, thereby aiding in the identification of the attacker. The determination and attribution is based on the realization that attackers, in many cases, tend to sign up for their own user account with the computerized system prior to launching the attack, in order to study the security measures it employs and potentially also to look for suitable users to target.

The attribution of the attack to a specific user of the computerized system may leverage the fact that all users, including any potential attacker, have provided multiple typing samples of their credential upon signing up (or upon a later, credential change process). The typing samples, entered by the user in a row, were used in a conventional manner by the keystroke dynamics authentication functionality, to create each user's keystroke dynamics model. For example, by determining how the user tends to type the characters of the credential. As a simplified example, if the user's credential is a password that reads "a1b", the keystroke dynamics authentication functionality may base the user's model on the average duration of pressing each of the characters "a", "1", and "b", on the average interval between typing "a" and "1" and between typing "1" and "b", and/or other similar statistics that are tied to specific characters.

Embodiments of the present invention can make additional use of each user's typing samples, beyond the standard utilization for creating the keystroke dynamics model. In addition, embodiments of the present invention extract from the samples a set of features that characterize typing changes between the multiple typing samples. The features result from what can be referred to as the user's 'learning curve' in the repeated typing of the same credential during sign up (or credential change). A user's keystroke dynamics tend to gradually change along the consecutive typings, which is precisely what might happen when an attacker enters a target user's credential over and over again. Accordingly, by comparing the temporal changes in an attacker's log in attempts against temporal changes that were recorded earlier for each user, the attacker can potentially be identified as one of the users of the computerized system.

However, embodiments of the present invention recognize that matching the attacker's temporal typing changes against those of other users is not straightforward, mainly because the attacker's own credential (e.g., a password that reads "john2020") is almost always different from the target user's credential (e.g., a password that reads "jane123"). Therefore, to facilitate such comparison, embodiments of the present invention can perform a series of calculations that ultimately represent the feature sets of all users in a uniform manner, which is agnostic as to both (a) the actual keys pressed to type each credential, and (b) the length of each credential. For example, each feature set may be represented as a feature vector of a uniform length and a same structure.

Once such uniform feature sets are available for all users, the computerized system may respond to an attack by extracting such uniform feature set also for the attacker's log in attempts and comparing the attacker's feature set with those of all or some of the computerized system's users. For example, the comparison may include the application of a machine learning algorithm to the feature sets, or the calculation of a mathematical distance metric between the attacker's feature set and the other feature sets.

In another aspect, to reduce the computational resources needed for each such comparison, embodiments of the present invention can select a smaller subset of the computerized system's users for the comparison. For example, if the computerized system is of a social network, then the comparison may be performed only among users of the social network who are linked to (e.g., 'friends' with) the target user. Similarly, any form of connection between users of the computerized system, such as past interactions or other manners of indicating the users are related, may be leveraged in order to narrow down the list of users against which the attacker's feature set is compared.

Reference is now made to FIG. 1, which shows a block diagram of an exemplary computer system 100 that is configured to estimate the identity of a user who attempts to log into it by circumventing keystroke dynamics authentication functionality. System 100 may include one or more hardware processor(s) 102, a random-access memory (RAM) 104, and one or more computer-readable storage device(s) 106.

Storage device(s) 106 may have stored thereon program instructions and/or components configured to operate hardware processor(s) 102. The program instructions may include one or more software modules, such as an attacker identification module 108. The software components may include an operating system having various software components and/or drivers for controlling and managing general system tasks (e.g., memory management, storage device control, power management, etc.), and facilitating communication between various hardware and software components.

System 100 may operate by loading instructions of attacker identification module 108 into RAM 104 as they are being executed by processor(s) 102. The instructions of attacker identification module 108 may cause system 100, during a sign-up process and/or a credential change process, to record a user keystroke session (block 110) for each of the system's users, and extract respective user feature sets (block 112) that characterize typing changes between multiple typing samples of the keystroke session. In response to a detecting an attack, the instructions of attacker identification module 108 may cause system 100 to extract a set of features that characterize typing changes between the attacker's repeated credential typings (block 114), compare the features with the user feature sets (block 112) previously extracted for some or all of the users, and estimate the identity of the attacker (block 116) among the system's users.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 100 may be co-located or distributed, or the system could run as one or more cloud computing "instances," "containers," and/or "virtual machines," as known in the art.

Figure 2:
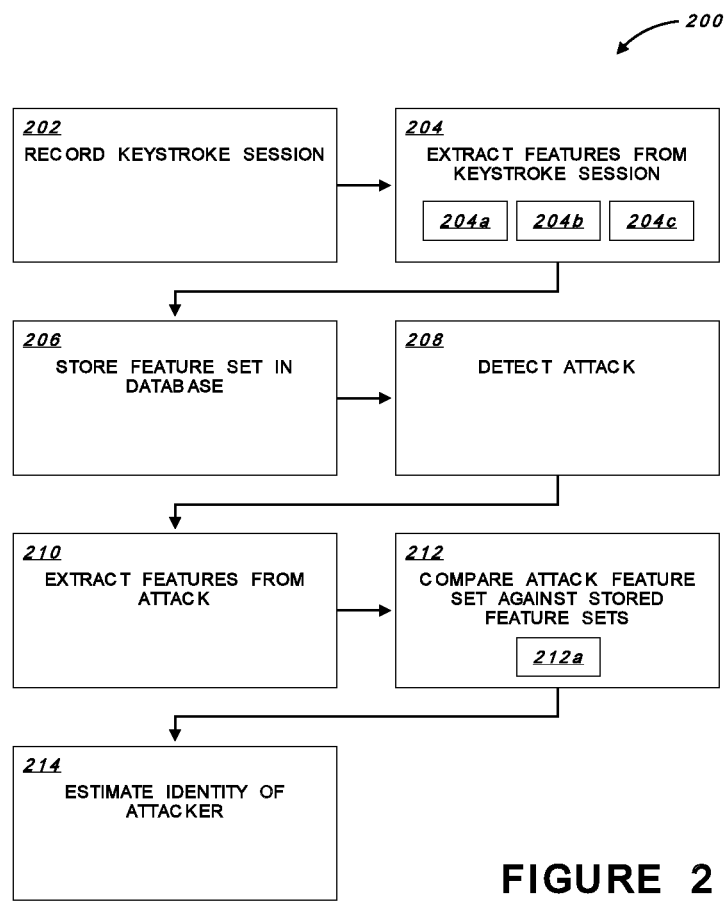
FIG. 2 is a flowchart of a method for estimating the identity of a user who attempts to log into a system by circumventing keystroke dynamics authentication functionality, in accordance with embodiments of the present invention.

The instructions of attacker identification module 108 are now discussed with reference to the flowchart of FIG. 2, which illustrates a method 200 for estimating the identity of a user who attempts to log into a computerized system, such as system 100 of FIG. 1, it by circumventing keystroke dynamics authentication functionality, in accordance with embodiments of the present invention.

Steps of method 200 may either be performed in the order presented or in a different order (or even in parallel), as long as the order allows for a necessary input to a certain step to be obtained from an output of an earlier step. In addition, the steps of method 200 are performed automatically (e.g., by system 100 of FIG. 1), unless specifically stated otherwise.

In step 202, method 200 records a keystroke session for each of a plurality of users of the system. Each such keystroke session may include multiple typing samples of a credential associated with the respective user, such as a username, email address, password, or any other multi-character credential (including one or more letters, numbers, symbols, and/or the like) selected by that user or assigned to that user by the system. In various embodiments, the user may be prompted by the system to type a credential multiple times in a row (e.g., over a total duration limited to 5, 10, 20, 30, 40, 50, or 60 seconds, or any value in between or exceeding), for example inside one or multiple fields provided in a graphical user interface (GUI) provided by the system. Method 200 can record each such typing by the user as a separate typing sample, such that the recorded keystroke session includes an ordered set of consecutively-typed typing samples.

The user may type the credential on a computerized device that is connected, for example, via a computer network such as a Local Area Network (LAN) or the Internet, to the system. The user may use a physical keyboard or a virtual keyboard (e.g., facilitated by a touch screen or by an on-screen virtual keyboard that is operated using a pointing device) of his or her computerized device for typing the credential.

Based on step 202, method 200 can create a conventional keystroke dynamics model of the pertinent user utilizing a keystroke dynamics authentication functionality of the system. In one embodiment, the keystroke dynamics authentication functionality is an aspect of the authentication system, which method 200 can utilize in accordance with various aspects of the present invention. Embodiments of the present invention can perform step 202 conventional methods which are therefore not described here.

In step 204, method 200 extracts a set of features that characterize typing changes between the multiple typing samples from each of the keystroke sessions. In various embodiments, the process of extracting features from a keystroke session in step 204 can include sub-steps 204a, 204b, and 204c, discussed in further detail below.

In sub-step 204a, method 200 calculates digraph latencies between keystroke events of each of the typing samples. A digraph latency, as known in the field of keystroke dynamics, is the time differences between two keystroke events. For example, such keystroke events may include press to consecutive press, press to consecutive release, release to consecutive release, and/or release to consecutive press. In example embodiments, the keystroke events, are key-agnostic, namely, the events only take into consideration the serial position of each pressed key in a typing sample, and not the identity of the key itself (the particular letter, number, or symbol entered). As a simplistic example, based on a typing sample of a credential "a1b", the three characters are given serial numbers from 1 to 3, respectively; then, nine digraph latencies may be calculated as follows:

TABLE 1

Digraph latency calculation for four keystroke event types

|  | #1 ("a") | #2 ("1") | #3 ("b") |
|---|---|---|---|
| Press to consecutive press | Press of "a" to press of "1" | Press of "1" to press of "b" | n/a |
| Press to | Press of "a" to | Press of "1" to | Press of "b" to |

TABLE 1-continued

Digraph latency calculation for four keystroke event types

|  | #1 ("a") | #2 ("1") | #3 ("b") |
|---|---|---|---|
| consecutive release | release of "a" | release of "1" | release of "b" |
| Release to consecutive release | Release of "a" to release of "1" | Release of "1" to release of "b" | n/a |
| Release to consecutive press | Release of "a" to press of "1" | Release of "1" to press of "b" | n/a |

To account for the fact that credentials of different users may be different lengths, method 200 does not need to use all of the calculated digraph latencies of the four exemplary keystroke event types. Instead, method 200 can reduce the calculated digraph latencies, for each keystroke event type, to a single value. For example, method 200 can utilize the median or mean value of the digraph latencies of each keystroke event type as a representative value of that keystroke event type. Referring to the above example, if the press to consecutive release latency was 300 ms (milliseconds) for key #1, 170 ms for key #2, and 130 ms for key #3, then method 200 can utilize a mean value of 200 ms or a median value of 170 ms to represent the digraph latency of this keystroke event in that typing sample, in a manner which is agnostic to the length of the credential.

In another embodiment, method 200 can also calculate (for each typing sample) a digraph latency between a first one of the keystroke events (in the above example, the press of key #1) and a last one of the keystroke events (in the above example, the release of key #3). Even though this digraph latency is clearly dependent on the length of the typed credential, the value can still be a useful metric when such digraph latencies across all typing samples are compared. For example, method 200 can utilize the value to make an observation that the particular user tends to type each consecutive sample 20% faster than the previous one, which is further discussed below.

In a further embodiment, method 200 can also calculate (for each typing sample) a digraph latency between a first one of the keystroke events (in the above example, the press of key #1) and a last one of the keystroke events of the previous typing sample (not given in the above example). In other words, this is the interval between every two consecutive typing samples. Naturally, method 200 does not calculate the value for the initial typing sample in the keystroke session, but rather only for the second and subsequent typing samples.

In addition to the digraph latencies described above, or instead of some of these digraph latencies, embodiments of the present invention ca operate to calculate and utilize digraph latencies between other types of keystroke-related events in each typing sample. In addition, embodiments of the present invention can calculate various statistical measures for more than two keystroke events at a time.

In example embodiments, as sub-step 204a concludes, each keystroke session is optionally represented as a feature matrix in which the rows are the consecutive samples of the keystroke session and the columns are the corresponding features (i.e., the various types of digraph latencies that were calculated). An example of such feature matrix is shown in Table 2 below.

For example, assuming a typing sample has six digraph latencies (press to consecutive press, press to consecutive release, release to consecutive release, release to consecutive press, first press to last release, and interval from previous typing sample), method 200 (via sub-step 204*a*) operates to provide six respective features. If the system, for instance, recorded the user typing their credential ten times in a row, then the feature matrix of the keystroke session is of the order 10×6.

TABLE 2

Feature matrix of a keystroke session. Column and row headers are shown only for convenience and need not be included in the real matrix.

|  | Feature 1 | Feature 2 | ... | Feature N |
|---|---|---|---|---|
| Sample 1 | | | | |
| Sample 2 | | | | |
| ... | | | | |
| Sample N | | | | |

In sub-step 204*b*, for each of the keystroke sessions, method 200 can calculate changes in digraph latencies between at least some of the typing samples. The calculation of sub-step 204*b* can operate to detect temporal changes in how the respective user typed the credential along the keystroke session. Typically, keystroke dynamics tend to gradually change as the user progresses along the sequence of typing samples. The changes are usually the result of the user's rapid cognitive improvement in performance of this typing task.

Various embodiments of the present invention can perform the calculation of the changes in a pair-wise method, with each pair including the value of a feature (a digraph latency) from two of the typing samples. The samples may be consecutive typing samples (e.g., sample 1 and sample 2) or non-consecutive ones (e.g., sample 2 and sample 5). Another option is to aggregate the values of a feature from two or more typing samples (consecutive or non-consecutive ones), and to compare that aggregate with the value of the feature from a single typing sample or even with another aggregate. For example, the aggregation may include statistical calculation such as averaging of the values. As another example, the aggregation may include comparing a feature in a certain sample (e.g., in sample 1) against the same feature in each of several other samples (e.g., samples 2, 3, 4, and 5); then, the calculated change along the samples may be, for instance, the rate of change, which could be linear, exponential, or even defined by a custom function (e.g., a polynomial function, a piecewise function, etc.).

Notably, not all typing samples necessarily participate in the calculation. For example, embodiments of the present invention can determine in a certain scenario that a calculation based on just the first two typing samples and the last two typing samples sufficiently captures the most significant temporal changes along a keystroke session. In such scenarios, the preceding sub-step 204*a* does not have to include digraph latency calculation for any non-utilized typing samples.

The pair-wise calculation of sub-step 204*b* may include at least one mathematical operation applied to the two values of the pair. For example, the values may be subtracted, added, multiplied, divided, raised to the power of one another, averaged, and/or the like. Method 200 can also operate to amplify the values, or attenuate the values by some predefined coefficient, linear or exponential.

Then, in sub-step 204*c*, method 200 can generate a uniform feature vector for each of the keystroke sessions. Namely, method 200 can generate the feature vectors at a length and a structure which are uniform across all keystroke sessions, which can uniformity ensure that the representation of keystroke sessions of different users remains indifferent to varying credential lengths across users.

The generation of each the uniform feature vector in sub-step 204*c* may include statistical processing of the calculated changes of the respective keystroke session. The processing may entail calculation of one or more statistical functions such as standard deviation, mean, median, mean gradient, and/or histogram analysis for the changes calculated in the previous sub-step 204*b*, which are just a few examples of statistical functions which may be used. One or more other statistical functions that are known in the art may be used just as well, as long as they are able to meaningfully summarize the multiple calculated changes per feature.

For each keystroke session, the statistical processing may produce a numerical value per feature, which represents the temporal change of that feature along the keystroke session. The numerical values of all features of a keystroke session form the uniform feature vector of that keystroke session. Since method 200 can uniformly apply sub-steps 204*a*, 204*b*, and 204*c* for all keystroke sessions, the resulting feature vector is indeed uniform in length (number of features it contains) and structure (the type of features and their order in the vector).

Optionally, each feature vector also undergoes dimensionality reduction in order to compress it in a manner that preserves its most significant characteristics. For example, various embodiments of the present invention can utilize Principal Component Analysis (PCA) or Linear Discriminant Analysis (LDA), as known in the art, to reduce the dimensionality. As another option, embodiments of the present invention can apply a feature selection algorithm, as known in the art, to each feature vector, in order to search for and evaluate various different subsets of features that better characterize the temporal typing changes along the keystroke session.

Next, in step 206, method 200 stores the feature sets (extracted in step 204, and namely, the feature vectors finally generated in sub-step 204*c*) in a computerized database. The database may be part of system 100 (FIG. 1), or be included in a separate computer server which is in network communication with the system.

Notably, as new users may occasionally sign up to system 100 (FIG. 1), method 200 can execute steps 202-206 for every such sign-up, and then add the generated feature vector to the database. Similarly, whenever a credential change process is initiated for an existing user, method 200 can execute steps 202-206 and the generated feature vector replaces that user's old feature vector in the database. When operating to newly apply the present technique to a system having pre-existing users, method 200 can execute steps 202-206 on the previously-recorded keystroke sessions of users, assuming that such recordings were retained from when the users originally signed up.

In step 208, method 200 detects an attempt by an attacker to circumvent the system's keystroke dynamics authentication and log into the system. For example, the detection may be made by the system's keystroke dynamics authentication functionality, or by any other security-related functionality of the system, in accordance with various embodiments of the present invention.

The detected attempt may include repeated typing of a certain one of the credentials that is associated with a certain user. Method 200 can make the once a predefined number of such failed attempts is logged, for example, 3, 4 or 5 attempts (or any other smaller or larger number of attempts, defined by an administrator of the system). The detection of failed attempts indicates that whoever is typing the credential is possibly not the real user who owns the pertinent user account, but rather an attacker who managed to somehow compromise that user's credential and is attempting to log in to the system as that user.

In step 210, method 200 extracts a set of features that characterize typing changes between the detected repetitions from that repeated typing. The feature extraction step may include the same operations, mutatis mutandis, performed in step 204 for the keystroke sessions of the system's users. That is, method 200 can treat each typing of the credential by the attacker the same way as a user's typing sample, and the series of repeated typing is treated the same as a user's keystroke session. Accordingly, the description of extracting the feature set from the attacker's repeated typing is not repeated here and is discussed in further detail above.

As step 210 concludes, method 200 can provide a final feature set, optionally represented as a feature vector, of the attack attempt. In the execution of step 210, method 200 can perform all operations in the same way as the operations performed in step 204 for each keystroke session, such that the feature vector of the attack attempt is uniform (length-wise and structure-wise) with the feature vectors of all keystroke sessions. Hence, the feature vectors can later be readily compared.

In step 212, method 200 compares the feature set of the attack attempt against feature sets of at least some of the keystroke sessions of the system's users, which are fetched from the database. In an optional sub-step 212a, to reduce the heavy computational load that may result from comparing the attacker's feature set against keystroke session feature sets of all the users of the system, method 200 can perform intelligent selection of a smaller number of users. For example, the selection may be of keystroke sessions that are associated with users who are linked, in the system, to the certain user whose account was the target of the attack. For example, if the system is of a social network (e.g., social networking website or platform, etc.) or an instant messaging platform (e.g., internet messaging service, social media messaging service, etc.), then the comparison may be performed only against keystroke sessions of users who the system defines as linked to (e.g., 'friends' with) the target user.

Additionally, or alternatively, various embodiments of the present invention can leverage any implicit linkage between users of the computerized system to narrow down the list of users whose keystroke sessions are compared against. Such implicit linkage may be deduced, for example, from the existence of past interactions between users inside the system, such as a direct message exchange between users, interaction of one user with content posted in the system by another user (e.g., commenting on a post, 'liking' a post, etc.), etc.

In example embodiments, method 200 can base the comparison of step 212 on a machine learning algorithm that generates, for each of the keystroke sessions of the selected users, a probability score that denotes the likelihood that the pertinent user is the attacker. The machine learning algorithm may be, for example, a Random Forest algorithm, a Support Vector Machine (SVM), a Naïve Bayes algorithm, or the like. Those of skill in the art will recognize other machine learning algorithms that are suitable for generating the probability scores.

Various embodiments of the present invention can train the machine learning algorithm on a training set including feature vectors of multiple users (e.g., at least 50, 100, 200, or 500 users), each feature vector labeled with a unique identifier of the pertinent user (e.g., a simple serial number allocated to that user for purposes of the training). In the training set, each user has at least one feature vector associated with the user. However, it may be beneficial to have multiple feature vectors for each user, namely feature vectors resulting from separate keystroke sessions of the user, which were recorded at least a few minutes, hours, or even days apart. Embodiments of the present invention recognize that the more feature vectors available for each user, the better the machine learning algorithm can learn the underlying characteristics of these feature vectors, which make them belong to the same class (namely, user identifier) denoted by the labels.

The machine learning model (also, "classifier") produced by this training is then capable of calculating a probability that a new, previously unseen feature vector belongs to various known classes, which are the existing users of the system (or a narrowed-down subset of the users). Namely, when the trained machine learning model is applied to the new feature vector (i.e. attack feature vector), he trained machine learning model will assign probability scores to the various existing users.

As an alternative to machine learning, method 200 can base the comparison of step 212 on a mathematical distance metric that quantifies the distance (or "similarity") between every two feature vectors, the vector of the attacker and the vector of one of the users. Examples of suitable distance metrics include the Manhattan distance, Euclidean distance, Chebyshev distance, etc. Those of skill in the art will recognize other mathematical distance metrics that are suitable for calculating a distance between two feature vectors.

Next, in step 214, method 200 estimates which one of the users is the likely attacker. In various embodiments, method 200 determines the estimation based on the results of the comparison of step 212, such method 200 identifies the user (i.e., keystroke session feature vector) whose comparison against the attacker (i.e., attack feature vector) yielded the highest probability score (in the case of the machine learning algorithm) or the shortest distance (in the case of the mathematical distance metric) as the estimated attacker. If multiple users have the same highest probability score or the same shortest distance, then method 200 can flag all of the corresponding users as potential attackers.

Furthermore, method 200 can operate to output a ranked list of likely attackers based on the top-k probability scores or bottom-k distances, where k can be set as desired, such as between 2-20 or beyond. In either case, method 200 can transmit the identity of the likely attacker(s), namely details of the corresponding user account in the system (e.g., username, email address, linked Single Sign-On account, etc.), to an administrator of the system, to a person responsible for the system's security, and/or the like. That person may take measures to stop the attack or prevent a subsequent attack, such as by suspending the user account of the attacker, requiring the targeted user to change their credential, and/or the like. Alternatively, embodiments of the present invention can automatically initiate one or more such measures by the system, once the attacker's likely identity becomes known.

One of the advantages of the present technique is the deterrence it can potentially create among potential attackers. Once it becomes known that a certain system uses the present technique for identifying attackers, potential attackers will likely be discouraged from targeting users of the system; the attackers will understand that any attempt to log into other user accounts in the system by repeatedly typing a compromised credential of a user will only allow the system to associate the attack with the attacker's own user account which they opened in preparation of the attack. Thus, unless the attacker is certain they can circumvent the system's keystroke dynamics authentication functionality in the first trial or the first few trials (which is highly unlikely), the attacker will know that repeated typing of a user's credential will only further expose them.

The present technique may be employed together with other conventional measures of computer security forensics. For example, in addition to recording each user's keystroke session and the attacker's attempt, identifiers such as IP address, User-Agent string, and/or MAC (Media Access Control) addresses may be collected. If the attacker maintained the same identifier(s) from the time they signed up for a user account to the time they executed the attack, associating the attack with a certain user account may be done with higher confidence. Additional possibilities for identifiers include those created by conventional behavioral biometric techniques, such as unique patterns of pointing device movement, touch screen interaction, etc. Generally, an ensemble of the present technique with one or more additional user identifier may enhance the accuracy of estimation of who the attacker is among users of a particular system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    recording for a plurality of users of a computerized system, respective keystroke sessions that each include multiple typing samples of a credential associated with respective users of the plurality of users, wherein the multiple typing samples are typed consecutively by each respective user;
    extracting from each of the respective keystroke sessions, a set of reference features that characterize typing changes between the multiple typing samples recorded for a respective user of the plurality of users;
    detecting, repeated typing of a first credential associated with a first user of the plurality of users;
    extracting from the repeated typing of the first credential by the first user, a set of typing features that characterize typing changes between repetitions of typing the first credential; and
    comparing the set of typing features against the sets of reference features extracted from the respective keystroke sessions to estimate which user of the plurality of users is the first user.

2. The method of claim 1, wherein the comparison is based on a machine learning algorithm.

3. The method of claim 1, wherein the comparison is based on a mathematical distance metric.

4. The method of claim 1, further comprising:
    selecting, by one or more processors, as the set of the keystroke sessions used in the comparison, keystroke sessions that are associated with respective users that are linked, in the computerized system, to the certain user.

5. The method of claim 1, wherein the extraction of the feature set from each of the respective keystroke sessions comprises:
    for each of the typing samples, calculating:
        (a) digraph latencies between key-agnostic keystroke events, wherein the keystroke events are selected from the group consisting of: press to consecutive press, press to consecutive release, release to consecutive release, and release to consecutive press,
        (b) a digraph latency between a first one of the keystroke events and a last one of the keystroke events; and
    for each of the typing samples except for an initial one of the typing samples, calculating:
        (c) a digraph latency between a first one of the keystroke events and a last one of the keystroke events of a previous typing sample.

6. The method of claim 5, wherein the extraction of the feature set from each of the respective keystroke sessions further comprises:
    calculating, by one or more processors, changes in the digraph latencies of at least one of the digraph latencies selected from the group consisting of: the digraph latencies between key-agnostic keystroke events, the digraph latency between a first one of the keystroke events and a last one of the keystroke events , and the digraph latency between a first one of the keystroke events and a last one of the keystroke events of the previous typing sample, between at least some of the typing samples.

7. The method of claim 6, wherein the extraction of the feature set from each of the respective keystroke sessions further comprises:
    statistically processing, by one or more processors, the calculated changes, to generate a feature vector of the respective keystroke session, and
    wherein the feature vectors of the keystroke sessions are generated at a uniform length and a uniform structure.

8. The method of claim 1, wherein the extraction of the feature set from the repeated typing of the certain credential by the first user comprises:
    for each of the repetitions, calculating:
        (a) digraph latencies between key-agnostic keystroke events, wherein the keystroke events are selected from the group consisting of: press to consecutive press, press to consecutive release, release to consecutive release, and release to consecutive press,
        (b) a digraph latency between a first one of the keystroke events and a last one of the keystroke events; and
    for each of the repetitions except for an initial one of the repetitions, calculating:
        (c) a digraph latency between a first one of the keystroke events and a last one of the keystroke events of a previous typing sample.

9. The method of claim 8, wherein the extraction of the feature set from the repeated typing of the certain credential by the first user further comprises:
    calculating, by one or more processors changes in in the digraph latencies of at least one of the digraph latencies between key-agnostic keystroke events, the digraph latency between a first one of the keystroke events and a last one of the keystroke events, and the digraph latency between a first one of the keystroke events and a last one of the keystroke events of the previous repetition, between at least some of the repetitions.

10. The method of claim 9, wherein the extraction of the feature set from the repeated typing of the certain credential by the first user further comprises:
statistically processing, by one or more processors, the calculated changes, to generate a feature vector of the attempt by the first user.

11. A computer program product comprising:
one or more computer readable storage media and program instructions stored on the one or more computer readable storage media, the program instructions comprising:
program instructions to record, for a plurality of users of a computerized system, respective keystroke sessions that each include multiple typing samples of a credential associated with respective users of the plurality of users, wherein the multiple typing samples are typed consecutively by each respective user;
program instructions to extract, from each of the respective keystroke sessions, a set of reference features that characterize typing changes between the multiple typing samples recorded for a respective user of the plurality of users;
program instructions to detect repeated typing of a first credential associated with a first user of the plurality of users;
program instructions to extract, from the repeated typing of the first credential by the first user, a set of typing features that characterize typing changes between repetitions of typing the first credential; and
program instructions to compare the set of typing features against the sets of reference features extracted from the respective keystroke sessions to estimate which user of the plurality of users is the first user.

12. The computer program product of claim 11, wherein the extraction of the feature set from each of the respective keystroke sessions comprises:
for each of the typing samples, program instructions to calculate:
(a) digraph latencies between key-agnostic keystroke events, wherein the keystroke events are selected from the group consisting of: press to consecutive press, press to consecutive release, release to consecutive release, and release to consecutive press,
(b) a digraph latency between a first one of the keystroke events and a last one of the keystroke events; and
for each of the typing samples except for an initial one of the typing samples, program instructions to calculate:
(c) a digraph latency between a first one of the keystroke events and a last one of the keystroke events of a previous typing sample.

13. The computer program product of claim 11, wherein the extraction of the feature set from the repeated typing of the certain credential by the first user comprises:
for each of the repetitions, program instructions to calculate:
(a) digraph latencies between key-agnostic keystroke events, wherein the keystroke events are selected from the group consisting of: press to consecutive press, press to consecutive release, release to consecutive release, and release to consecutive press,
(b) a digraph latency between a first one of the keystroke events and a last one of the keystroke events; and
for each of the repetitions except for an initial one of the repetitions, program instructions to calculate:
(c) a digraph latency between a first one of the keystroke events and a last one of the keystroke events of a previous typing sample.

14. The computer program product of claim 11, further comprising program instructions, stored on the one or more computer readable storage media, to:
select as the set of the keystroke sessions used in the comparison, keystroke sessions that are associated with respective users that are linked, in the computerized system, to the certain user.

15. A computer system comprising:
one or more computer processors;
one or more computer readable storage media; and
program instructions stored on the computer readable storage media for execution by at least one of the one or more processors, the program instructions comprising:
program instructions to record, for a plurality of users of a computerized system, respective keystroke sessions that each include multiple typing samples of a credential associated with respective users of the plurality of users, wherein the multiple typing samples are typed consecutively by each respective user;
program instructions to extract, from each of the respective keystroke sessions, a set of reference features that characterize typing changes between the multiple typing samples recorded for a respective user of the plurality of users;
program instructions to detect repeated typing of a first credential associated with a first user of the plurality of users;
program instructions to extract, from the repeated typing of the first credential by the first user, a set of typing features that characterize typing changes between repetitions of typing the first credential; and
program instructions to compare the set of typing features against the sets of reference features extracted from the respective keystroke sessions to estimate which user of the plurality of users is the first user.

16. The computer system of claim 15, further comprising program instructions, stored on the computer readable storage media for execution by at least one of the one or more processors, to:
select as the set of the keystroke sessions used in the comparison, keystroke sessions that are associated with respective users that are linked, in the computerized system, to the certain user.

17. The computer system of claim 15, wherein the extraction of the feature set from each of the respective keystroke sessions comprises:
for each of the typing samples, program instructions to calculate:
(a) digraph latencies between key-agnostic keystroke events, wherein the keystroke events are selected from the group consisting of: press to consecutive press, press to consecutive release, release to consecutive release, and release to consecutive press,
(b) a digraph latency between a first one of the keystroke events and a last one of the keystroke events; and
for each of the typing samples except for an initial one of the typing samples, program instructions to calculate:

(c) a digraph latency between a first one of the keystroke events and a last one of the keystroke events of a previous typing sample.

18. The computer system of claim 17, wherein the extraction of the feature set from each of the respective keystroke sessions further comprise program instructions to:
calculate changes in the digraph latencies of at least one of the digraph latencies selected from the group consisting of: the digraph latencies between key-agnostic keystroke events, the digraph latency between a first one of the keystroke events and a last one of the keystroke events, and the digraph latency between a first one of the keystroke events and a last one of the keystroke events of the previous typing sample, between at least some of the typing samples.

19. The computer system of claim 15, wherein the extraction of the feature set from the repeated typing of the certain credential by the first user comprises:
for each of the repetitions, program instructions to calculate:
(a) digraph latencies between key-agnostic keystroke events, wherein the keystroke events are selected from the group consisting of: press to consecutive press, press to consecutive release, release to consecutive release, and release to consecutive press,
(b) a digraph latency between a first one of the keystroke events and a last one of the keystroke events; and for each of the repetitions except for an initial one of the repetitions, program instructions to calculate:
(c) a digraph latency between a first one of the keystroke events and a last one of the keystroke events of a previous typing sample.

20. The computer system of claim 19, wherein the extraction of the feature set from each of the respective keystroke sessions further comprise program instructions to:
calculate changes in in the digraph latencies of at least one of the digraph latencies between key-agnostic keystroke events, the digraph latency between a first one of the keystroke events and a last one of the keystroke events, and the digraph latency between a first one of the keystroke events and a last one of the keystroke events of the previous repetition, between at least some of the repetitions.

* * * * *